(12) United States Patent
Biswas et al.

(10) Patent No.: US 11,451,666 B1
(45) Date of Patent: Sep. 20, 2022

(54) SYSTEMS AND METHODS FOR HANDLING CALLS BASED ON CALL INSIGHT INFORMATION

(71) Applicant: Verizon Patent and Licensing Inc., Basking Ridge, NJ (US)

(72) Inventors: Subham Biswas, Thane (IN); Saurabh Tahiliani, Noida (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/445,360

(22) Filed: Aug. 18, 2021

(51) Int. Cl.
*H04M 3/51* (2006.01)
*G10L 15/18* (2013.01)
*G10L 25/06* (2013.01)
*G10L 25/63* (2013.01)

(52) U.S. Cl.
CPC ....... *H04M 3/5183* (2013.01); *G10L 15/1815* (2013.01); *G10L 25/06* (2013.01); *G10L 25/63* (2013.01); *H04M 3/5175* (2013.01)

(58) Field of Classification Search
CPC .............. H04M 3/5183; H04M 3/5175; G10L 15/1815; G10L 25/06; G10L 25/63

USPC ........... 379/265.09, 265.03, 265.05, 265.06, 379/265.11, 266.1, 265.07
See application file for complete search history.

(56) References Cited

U.S. PATENT DOCUMENTS

| 10,573,312 B1* | 2/2020 | Thomson ................ G10L 15/26 |
| 2021/0157834 A1* | 5/2021 | Sivasubramanian ........................ G06F 16/686 |
| 2021/0158805 A1* | 5/2021 | Sivasubramanian ... G06F 16/61 |

* cited by examiner

*Primary Examiner* — Thjuan K Addy

(57) ABSTRACT

A device may receive audio data of a first call between a first user and a second user. The device may generate, based on the audio data, time series data associated with an audio signal of the first call and may process, using a first machine learning model, the time series data to generate first call insight information regarding one or more first insights associated with the first call. The device may process the audio data to generate image data associated with the audio signal and may process, using a second machine learning model, the image data to generate second call insight information regarding one or more second insights associated with the first call. The device may combine the first call insight information and the second call insight information to generate combined call insight information and cause an action to be performed based on the combined call insight information.

20 Claims, 10 Drawing Sheets

SYSTEMS AND METHODS FOR HANDLING CALLS BASED ON CALL INSIGHT INFORMATION

BACKGROUND

A first user and a second user may engage in a conversation during a telephone call. A transcript of the conversation may be generated. For example, a device may generate the transcript using a speech-to-text functionality. The transcript may be used for training purposes.

DETAILED DESCRIPTION OF PREFERRED EMBODIMENTS

Figure 1A:
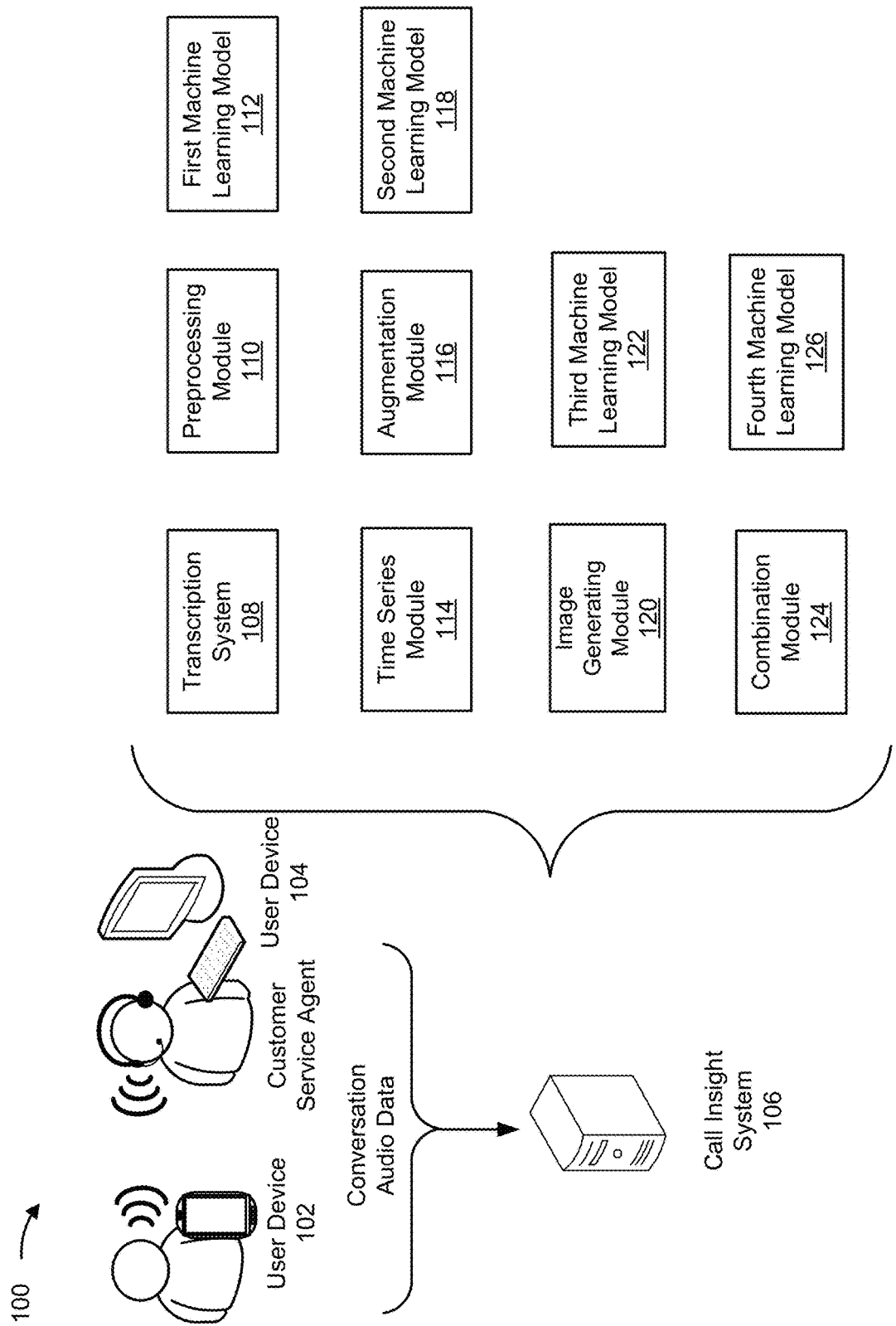
FIGS. 1A-1F are diagrams of an example associated with handling calls based on call insight information.

The following detailed description of example implementations refers to the accompanying drawings. The same reference numbers in different drawings may identify the same or similar elements.

Calls between customers and customer service agents are routinely recorded for training purposes. Typically, these calls may be recorded and transcriptions of the calls may be generated. The transcription may be used to train the customer service agent to handle additional calls.

The transcription may not include all information needed to properly train the customer service agent to handle additional calls or to properly assess a mental state of the customer service agent with respect to handling the additional calls. As a result, the customer service agent may be improperly trained, may be mentally unprepared, and may lack necessary information to handle the additional calls. Accordingly, routing a call from a customer to a device of the customer service agent that is improperly trained, that is mentally unprepared, and/or that does not have the necessary information to handle the call may result in further re-routing of the call to a device of another customer service agent.

Re-routing the call in this manner wastes computing resources, networking resources, and other resources of a call center. Additionally, re-routing the call may be a lengthy process. Accordingly, re-routing the call also wastes computing resources, networking resources, and other resources associated with a device of the customer being placed on hold while the call is being re-routed.

Some implementations described herein relate to a call insight system that generates call insight information regarding call insights associated with a call between two or more users (e.g., a customer and a customer service agent). The call insight information may be obtained from transcription data of a transcription of the call, from time series data of an audio signal of the call, and/or from images of a waveform and/or a spectrogram of the audio signal.

The call insight information may include information regarding the call and/or information regarding the users. The information regarding the call may include information regarding a context associated with the call, information regarding an intent associated with the call, information regarding a resolution associated with the call, among other examples. The information regarding the users may include information regarding a sentiment of the users during the call, information regarding a mental state of the users during the call (e.g., a measure of stress, a measure of anxiety, a measure of fatigue, among other examples), information regarding a measure of sarcasm of the users during the call, information regarding a dialect of the users, among other examples. In this regard, the call insight information includes information that would not have been captured by a transcription of the call alone.

The call insight information may be used to perform different actions, such as generating a profile of the customer and/or generating a profile of the customer service agent. The profile of the customer may be used to address additional calls from the customer (and/or from other customers that belong to a demographic of the customer). The profile of the customer service agent that may be used to identify calls to be routed to the customer service agent. Based on the foregoing, the profile of the customer may enable calls from the customer to be routed to an appropriate customer service agent. Additionally, the profile of the customer service agent may ensure that appropriate calls are routed to the customer service agent. Accordingly, the call insight system may use the call insight information to ensure that calls are routed to appropriate customer service agents.

By ensuring that calls are routed to appropriate customer service agents, the call insight system may preserve computing resources, networking resources, and other resources that would have otherwise been used to re-route calls to other customer service agents.

FIGS. 1A-1F are diagrams of an example 100 associated with handling calls based on call insight information. As shown in FIG. 1A, example 100 includes a user device 102, a user device 104, and a call insight system 106. The user device 102 may include a stationary or mobile user device. The user device 104 may include a stationary or mobile user device. The call insight system 106 may include a device or a collection of devices (e.g., associated with a cloud computing environment or a data center) that generate call insight information regarding call insights associated with calls. For example, the call insight system 106 may include a transcription system 108, a preprocessing module 110, a first machine learning model 112, a time series module 114, an augmentation module 116, a second machine learning model 118, an image generating module 120, a third machine learning model 122, a combination module 124, and a fourth machine learning model 126. The calls may include telephone calls, video calls, among other examples. The user device 102, the user device 104, and the call insight system 106 are described in more detail below in connection with FIGS. 3 and 4.

In the description to follow and merely as an example, a customer may use the user device 102 to place a call to engage in a conversation (e.g., a telephone conversation) with a customer service agent. The call may be routed to the user device 104 of a customer service agent. While the description refers to a telephone conversation between two users, the description is applicable to a conversation (e.g., a telephone conversation, a video conference conversation, and/or an in-person conversation) between more than two users or between a voicebot and one or more users. More-over, in the description to follow and merely as an example, assume that the customer service agent and/or another user (e.g., a supervisor of the customer service agent) desires call insights regarding the call for training purposes and for call handling (or call routing) purposes. In this regard, the customer service agent and/or the supervisor may submit a call insight request to the call insight system 106.

Figure 1B:
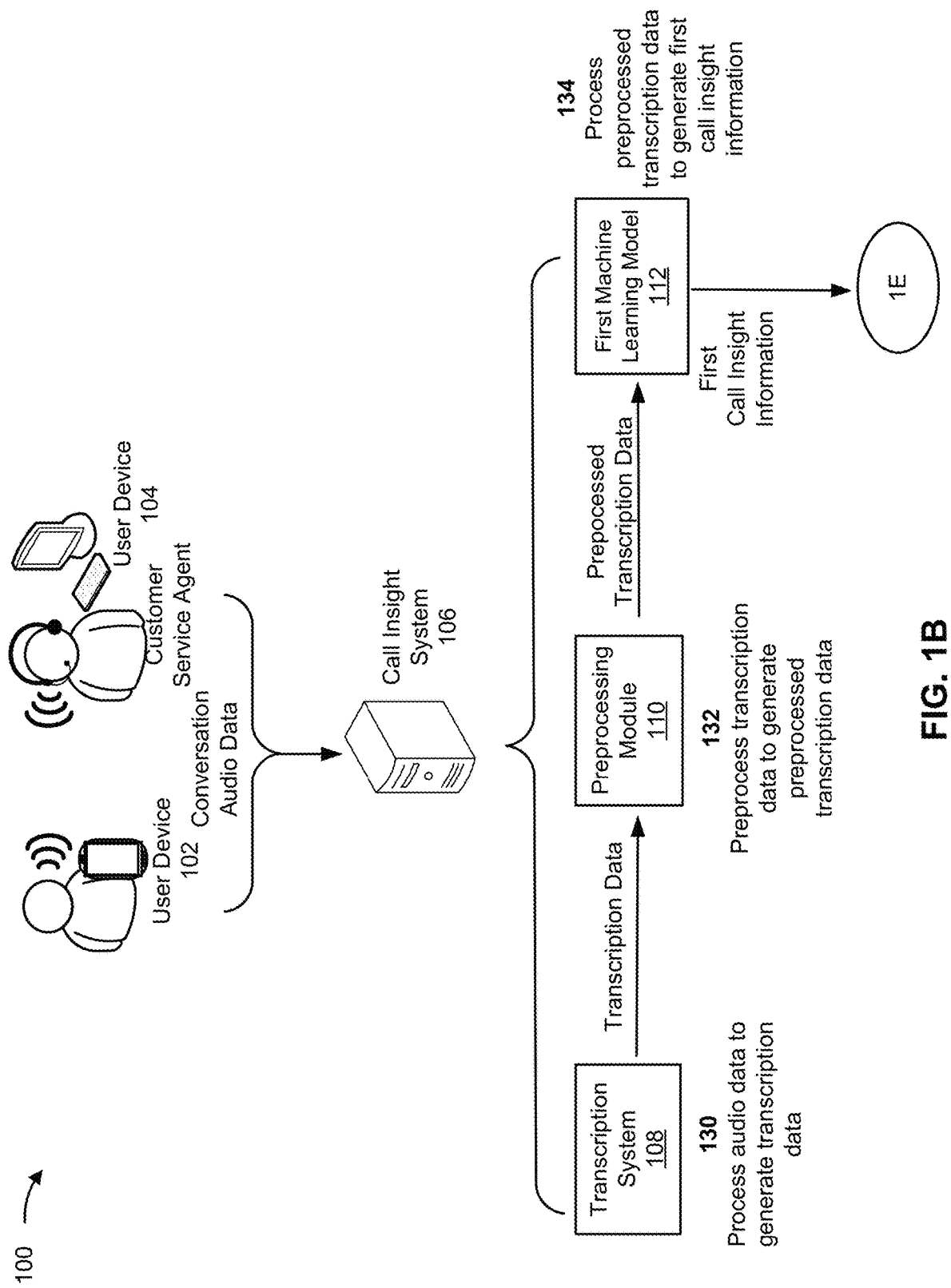

As shown in FIG. 1B, and by reference number 130, the call insight system 106 may process audio data to generate transcription data. For example, based on the call insight request, audio data of the call may be provided to the call insight system 106 to cause the call insight system 106 to generate a transcription of the call (e.g., a transcription of the conversation). For instance, the transcription system 108 may process the audio data to generate the transcription data (of the transcription). The audio data of the call may include audio data of the conversation and the transcription may include a textual description of the conversation. In some examples, the audio data of the call may be recorded by the user device 104 and provided to the call insight system 106 (as part of the call insight request) to cause the call insight system 106 to generate the transcription data.

The transcription system 108 may include a device or a collection of devices (e.g., associated with a cloud computing environment or a data center) that generate transcriptions of calls between multiple users. For example, the transcription system 108 may include speech-to-text capabilities for transcribing the call, based on the audio data, and generating the transcription data.

In some implementations, the transcription system 108 may include a speech-to-text generator that converts the audio data into text (e.g., converts speech from the audio data into text). In this regard, the transcription data may include the text. In some examples, the text may be annotated with information identifying a first user (e.g., the customer service agent) and information identifying a second user (e.g., the customer).

In some implementations, the transcription system 108 may generate the transcript dynamically during the conversation. In some implementations, the transcription system 108 may generate the transcript based on an event. The event may include detection of a termination of the conversation, receipt of a request to generate the transcript from another device (e.g., the user device 104), detection of the audio data being uploaded to the transcription system 108, among other examples.

As shown in FIG. 1B, and by reference number 132, the call insight system 106 may preprocess the transcription data to generate preprocessed transcription data. For example, the call insight system 106 may preprocess the transcription data using the preprocessing module 110. The preprocessing module 110 may include a device or a collection of devices (e.g., associated with a cloud computing environment or a data center) that perform different preprocessing operations on data.

For example, the call insight system 106 (e.g., using the preprocessing module 110) may remove stop words from the transcription data to generate the preprocessed transcription data. In some implementations, the call insight system 106 may selectively remove stop words from the transcription data. For example, the call insight system 106 may retain negation stop words and remove stop words that are not negation stop words. Negation stop words may include words such as "no," "not" (and words combined with not), "none," "no one", "nothing," "never," "neither," and "nowhere," "among other examples.

Additionally, or alternatively, to removing stop words, the call insight system 106 may remove noise from the transcription data to generate the preprocessed transcription data. For example, the call insight system 106 may remove indications of pauses during the call, remove incomplete words, remove background noise, remove other outliers, and/or remove other information that do not provide contextual meaning, among other examples.

Additionally, or alternatively, to removing noise, the call insight system 106 may perform a textual alignment (or audio-to-text alignment) operation with respect to the text (from the transcription data) and the audio data to generate the preprocessed transcription data. For example, the call insight system 106 may cause the text to be aligned with the audio data based on timestamps of the audio data. For instance, the call insight system 106 may identify a first portion of the text associated with a corresponding first portion of the audio data, a second portion of the text associated with a corresponding second portion of the audio data, and so on. The corresponding first portion of the audio data may be associated with a first period of time identified by a first timestamp and a second timestamp, the corresponding second portion of the audio data may be associated with a second period of time identified by a third timestamp and a fourth timestamp, and so on. In this regard, the preprocessed transcription data may include information indicating that the first portion of the text is associated with the first period of time, that the second portion of the text is associated with the second period of time, and so on.

As shown in FIG. 1B, and by reference number 134, the call insight system 106 may process the preprocessed transcription data to generate first call insight information. For example, the call insight system 106 may process the preprocessed transcription data using the first machine learning model 112 to generate the first call insight information. As an example, the call insight system 106 may provide the preprocessed transcription data as an input to the first machine learning model 112, and the first machine learning model 112 may provide, as an output, the first call insight information.

The first call insight information may include information regarding the call, such as information regarding a context associated with the call, information regarding a sentiment of the customer service agent during the call, information regarding a sentiment of the customer during the call, information regarding an intent associated with the call, and/or information regarding a resolution associated with the first call, among other examples.

The first machine learning model 112 may include a neural network model. In some implementations, the neural network model may include an attention-based neural network model.

The first machine learning model 112 may be trained using historical data such as historical transcription data of historical calls. In some implementations, the first machine learning model 112 may be trained to identify information regarding the historical calls, such as information regarding contexts associated with the historical calls, information regarding sentiments of users (e.g., customers and/or customer service agents) during the historical calls, information regarding intents associated with the historical calls, and/or information regarding resolutions associated with the historical calls, among other examples. The information regarding the historical calls may include different words and/or different phrases.

For example, words such as "bill," "billing," or "invoice" may indicate that billing is a context while words such as "service," "change service," or "upgrade service" may indicate that service adjustment is a context. As another example, phrases such as "in my opinion, the call went well" or "I think the call went well" may indicate a positive sentiment while phrases such as "I am not happy with this call" or "I don't think the call went well" may indicate a negative sentiment.

Similarly, phrases such as "I am calling about" or "I would like to discuss" may indicate an intent. For example, phrases such as "I am calling about my bill" or "I would like to discuss my bill" may indicate that an intent associated with resolving a billing issue. Similarly, phrases such as "My issue has been resolved" or "I am satisfied with our call" may indicate a resolution.

The first machine learning model 112 may be trained as described in more detail below in connection with FIG. 2. In some examples, the call insight system 106 may train the first machine learning model 112. Additionally, or alternatively, a different device may generate and train the first machine learning model 112.

Figure 1C:
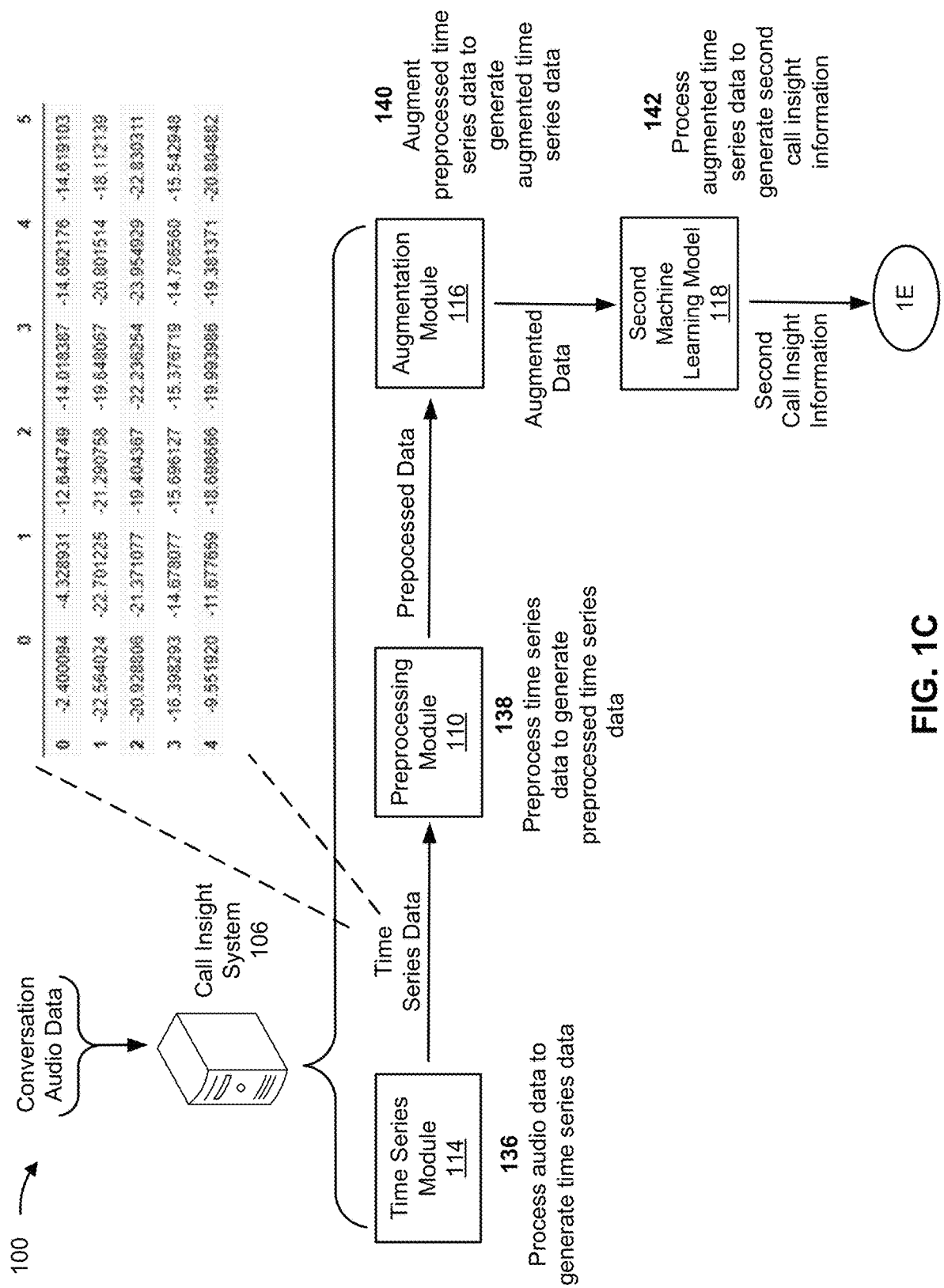

As shown in FIG. 1C, and by reference number 136, the call insight system 106 may process the audio data to generate time series data. For example, the call insight system 106 may process audio packets of the audio data to generate a numerical representation of an audio signal of the call. For instance, the numerical representation of the audio signal may be a time series of the audio signal. As an example, the numerical representation of the audio signal may be a time series of a waveform of the audio signal (e.g., a time series of amplitudes of the audio signal and/or of frequencies of the audio signal).

In some implementations, the time series data, of the time series of the audio signal, may identify different amplitudes of the audio signal over a period of time (e.g., over a duration of the call) and/or different frequencies of the audio signal over the period of time. A representation of the time series is shown in FIG. 1C for example. As shown in FIG. 1C, the columns of the representation may identify the period of time in a chronological order. For example, a first column may represent a first portion of the period of time, a second column may represent a second portion of the period of time (subsequent to the first portion), and so on. The rows of the representation may identify words and/or sentences spoken by the customer service agent and the customer. For example, a first row may represent a sentence uttered by the customer service agent, a second row may represent a sentence uttered by the customer service agent, a third row may represent a sentence uttered by the customer, and so on. The data may represent different amplitudes and/or different frequencies, of the audio signal corresponding to the words and/or sentences, over the period of time.

As shown in FIG. 1C, and by reference number 138, the call insight system 106 may preprocess the time series data to generate preprocessed time series data. For example, the call insight system 106 may preprocess the time series data using the preprocessing module 110. In some implementations, the call insight system 106 may preprocess the time series data using a different preprocessing module.

In some implementations, when preprocessing the time series data, the call insight system 106 may perform a data cleaning operation on the time series data. For example, the call insight system 106 may remove information regarding pauses in the audio signal from the time series data. Additionally, or alternatively to performing the data cleaning operation, the call insight system 106 may remove noise from the time series data in manner similar to the manner described above in connection with the transcription data. Additionally, or alternatively, to removing noise from the time series data, the call insight system 106 may perform an audio alignment operation in manner similar to the manner described above in connection with the transcription data. For example, the call insight system 106 may identify amplitudes, of the audio signal, associated with the different periods of time identified in connection with the transcription data. For instance, the call insight system 106 may identify a first amplitude associated with the first period of time, a second amplitude associated with the second period of time, and so on.

In this regard, the call insight system 106 may associate the first amplitude with the first period of time (and the first portion of text), associate the second amplitude with the second period of time and the second portion of text, and so on. In some examples, the preprocessed time series data may include information indicating that the first amplitude is associated with the first period of time (and the first portion of text), that the second amplitude is associated with the second period of time (and the second portion of text), and so on. The call insight system 106 may perform similar actions with respect to the frequencies of the audio signal.

Additionally, or alternatively, to performing the audio alignment operation, the call insight system 106 may perform a diarisation (or speaker diarisation) operation on the time series data. For example, the call insight system 106 may perform the diarisation operation to identify a first portion of the time series data corresponding to speech of the customer agent representative and a second portion of the time series data corresponding to speech of the customer. For instance, assume the speech of the customer service agent is obtained via a first channel and that the speech of the customer was obtained via a second channel. The call insight system 106 may identify the first portion of the time series data based on the first channel (or based on information identifying the first channel) and identify the second portion of the time series data based on the second channel (or based on information identifying the second channel). The call insight system 106 may perform the diarisation operation using one or more data processing techniques, such as Gaussian mixture model, Hidden Markov model, among other examples.

As shown in FIG. 1C, and by reference number 140, the call insight system 106 may augment the preprocessed time series data to generate augmented time series data. For example, the call insight system 106 may augment the preprocessed time series data using an augmentation module 116 to increase a size of the preprocessed time series data. For example, the call insight system 106 may double the size of the preprocessed time series data, triple the size of the preprocessed time series data, and quadruple the size of the preprocessed time series data, among other examples.

By increasing the size of the preprocessed time series data, the call insight system 106 may generate a sufficient amount of data as input to the second machine learning model 118 and, accordingly, increase a likelihood of the second machine learning model 118 identifying relevant information regarding the customer service agent and/or the customer, as described in more detail below. The augmentation module 116 may include a device or a collection of devices (e.g., associated with a cloud computing environment or a data center) that are configured to perform a data augmentation operation to increase the size of the preprocessed time series data. The augmentation module 116 may be configured to increase the size without compromising the content of the conversation (e.g., without compromising the audio data).

In some implementations, when augmenting the preprocessed time series data, the call insight system 106 (e.g., using the augmentation module 116) may add white noise (e.g., white noise data) to the preprocessed time series data. Additionally, or alternatively, to adding the white noise, the call insight system 106 may perform a random shifting operation on the preprocessed time series data. For example, the call insight system 106 may shift the audio signal forward or backward by one or more seconds. Additionally, or alternatively, to performing the random shifting operation, the call insight system 106 may perform a pitch tuning operation. For example, the call insight system 106 may adjust a pitch of the audio signal by increasing or decreasing a frequency of the audio signal.

In some instances, the call insight system 106 may adjust the pitch of the audio signal in this manner in order to normalize the pitch of the audio signal. The pitch of the audio signal may be normalized to enable the second machine learning model 118 to process the time series data in the same manner, irrespective of speech from a female user or a male user. Additionally, or alternatively, to performing the pitch tuning operation, the call insight system 106 may perform a speed adjustment operation. For example, the call insight system 106 may increase a speed of the conversation or decrease the speed of the conversation while maintaining the alignments discussed above.

As shown in FIG. 1C, and by reference number 142, the call insight system 106 may process the augmented time series data to generate second call insight information. For example, the call insight system 106 may process the augmented time series data using the second machine learning model 118 to generate the second call insight information. As an example, the call insight system 106 may provide the augmented time series data as an input to the second machine learning model 118, and the second machine learning model 118 may provide, as an output, the second call insight information.

The second call insight information may include information regarding the customer service agent and/or the customer, such as information regarding tones (e.g., an aggressive tone, a polite tone, a sarcastic tone, among other examples) of the customer service agent and/or the customer, information regarding accents (e.g., an American accent, a British accent, a French accent, among other examples) of the customer service agent and/or the customer, information regarding dialects (e.g., an Indian dialect, a Chinese dialect, a dialect from an African country, among other examples) of the customer service agent and/or the customer, information regarding a measure of fatigue (or tiredness) of the customer service agent and/or the customer, information regarding mood of the customer service agent and/or the customer, information regarding emotions of the customer service agent and/or the customer, information regarding a measure of stress of the customer service agent and/or the customer, information regarding a measure of anxiety of the customer service agent and/or the customer, among other examples. The second call insight information may include the information regarding the customer service agent and/or the customer for discrete portions of the call (e.g., for every millisecond of the call, every second of the call, among other examples).

The second machine learning model 118 may include a neural network model. In some implementations, the neural network model may include a recurrent neural network (RNN), a gated recurring units (GRU) RNN, a long short-term memory (LSTM) RNN, a residual LSTM, among other examples of neural network models trained to process time series data.

The second machine learning model 118 may be trained using historical data such as historical time series data audio signals of historical calls. In some implementations, the second machine learning model 118 may be trained to identify information regarding speakers who participated in the historical calls, such as information regarding tones of the speakers, information regarding accents of the speakers, information regarding dialects of the speakers, information regarding a measure of fatigue (or tiredness) of the speakers, information regarding a mood of the speakers, information regarding emotions of the speakers, information regarding a measure of stress of the speakers, information regarding a measure of anxiety of the speakers, among other examples.

The second machine learning model 118 may be trained to identify the information regarding the speakers at discrete portions of the historical calls (e.g., every millisecond, every second, among other examples). The information regarding the speakers may include different amplitudes of the audio signals of the historical calls, different frequencies of the audio signals, and/or different speeds of speech over a period of time (e.g., over a duration of the historical calls).

As an example, one or more first amplitudes and/or one or more first frequencies may indicate a first tone (e.g., an aggressive tone), one or more second amplitudes and/or one or more second frequencies may indicate a second tone (e.g., a passive tone), and so on. Similarly, one or more third amplitudes and/or one or more third frequencies may indicate a first accent, one or more third amplitudes and/or one or more third frequencies may indicate a second accent, and so on. Similarly, one or more fourth amplitudes and/or one or more fourth frequencies may indicate a first dialect, one or more fifth amplitudes and/or one or more fifth frequencies may indicate a second dialect, and so on.

As an example, a speed of speech that does not satisfy a threshold speed may indicate that a speaker is fatigued while a speed of speech that satisfies a threshold speed may indicate that a speaker is not fatigued. As another example, a speed of speech that satisfies the threshold speed in combination an amplitude that satisfies a threshold amplitude may indicate that a speaker is excited. As yet another example, a speed of speech that does not satisfy the threshold speed in combination an amplitude that does not satisfies the threshold amplitude may indicate that a speaker is sad.

As another example, a speed of speech that satisfies the threshold speed in combination with one or more fifth amplitudes and/or one or more fifth frequencies may indicate that a speaker is stressed. As yet another example, a speed of speech that does not satisfy the threshold speed in combination one or more sixth amplitudes and/or one or more sixth frequencies may indicate that a speaker is experiencing anxiety.

The second machine learning model 118 may be trained as described in more detail below in connection with FIG. 2. In some examples, the call insight system 106 may train the second machine learning model 118. Additionally, or alternatively, a different device may generate and train the second machine learning model 118.

Figure 1D:
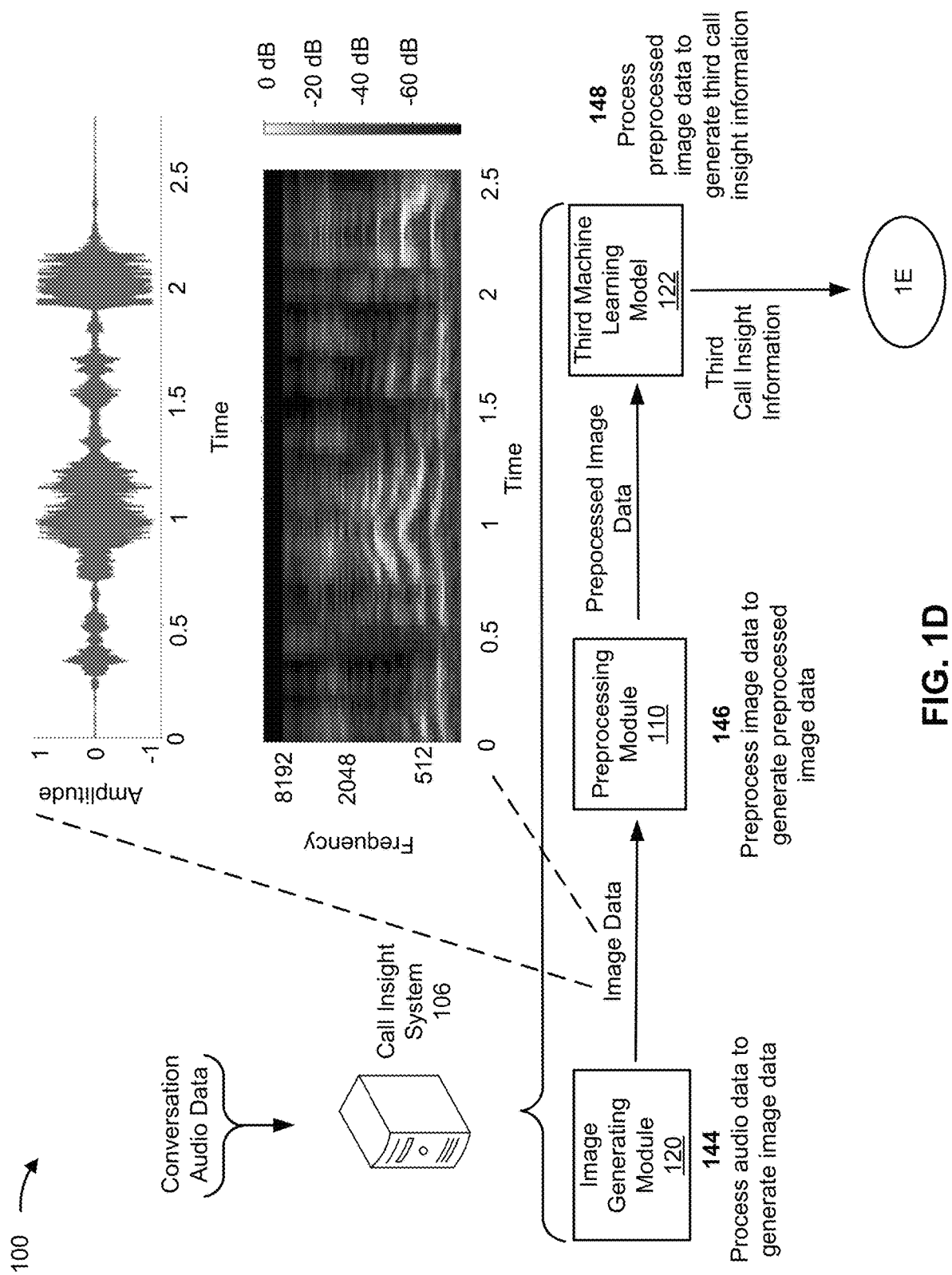

As shown in FIG. 1D, and by reference number 144, the call insight system 106 may process the audio data to generate image data. For example, the call insight system 106 may process the audio signal, using the image generating module 120, to generate the image data. The image generating module 120 may include a device or a collection of devices (e.g., associated with a cloud computing environment or a data center) that generate image data of audio signals.

In some implementations, the call insight system 106 may generate a graphical representation of the audio signal. For example, the call insight system 106 may generate a waveform of the audio signal, and/or a spectrogram of the audio signal, among other examples of graphical representations of audio signals. The call insight system 106 (e.g., the image generating module 120) may generate an image of the waveform and/or an image of the spectrogram. The image data may include data of the image of the waveform and/or data of the image of the spectrogram. In some examples, the spectrogram may include a Mel power spectrogram.

The image of the waveform and the image of the spectrogram are shown in FIG. 1D. The waveform may identify different amplitudes of the audio signal over a period of time (e.g., over the duration of the call). The spectrogram may identify different frequencies of the audio signal over the period of time (e.g., over the duration of the call). The spectrogram may include different color intensities that identify different amplitudes of the audio signal.

As shown in FIG. 1D, and by reference number 146, the call insight system 106 may preprocess the image data to generate preprocessed image data. For example, the call insight system 106 may preprocess the image data using the preprocessing module 110 to generate the preprocessed image data. In some implementations, the call insight system 106 may preprocess the image data using a different preprocessing module.

In some implementations, when preprocessing the image data, the call insight system 106 may adjust a size of the image of the waveform and/or a size of the image of the spectrogram to obtain the preprocessed image data. For example, the call insight system 106 may adjust the size of the image of the waveform and/or the size of the image of the spectrogram to a standard size. By adjusting the size to the standard size, images of audio signals, for calls of different lengths, may be a same size. In some examples, when adjusting the size, the call insight system 106 may adjust a resolution of the image of the waveform and/or the resolution of the image of the spectrogram to a standard resolution.

Additionally, or alternatively, to adjusting the size of the at least one the image of the waveform or the image of the spectrogram, the call insight system 106 may convert the image of the spectrogram to a black and white version of the spectrogram or a grayscale version of the spectrogram.

As shown in FIG. 1D, and by reference number 148, the call insight system 106 may process the preprocessed image data to generate third call insight information. For example, the call insight system 106 may process the preprocessed image data using the third machine learning model 122 to generate the third call insight information. As an example, the call insight system 106 may provide the preprocessed image data as an input to the third machine learning model 122, and the third machine learning model 122 may provide, as an output, the third call insight information. The third call insight information may include the information regarding the customer service agent and/or the customer over an entirety of the call (as opposed to discrete portions of the call, as described above in connection with FIG. 1C).

The third machine learning model 122 may include a neural network model. In some implementations, the neural network model may include a convolutional neural network (CNN) model, among other examples of neural network models that are trained to analyze image data.

The third machine learning model 122 may be trained using historical data such as historical image data of historical images of waveforms of audio signals (of historical calls) and/or historical images of spectrograms of the audio signals. In some implementations, similarly to the second machine learning model 118, the third machine learning model 122 may be trained to identify information regarding speakers who participated the historical calls, such as information regarding tones of the speakers, information regarding accents of the speakers, information regarding dialects of the speakers, information regarding a measure of fatigue (or tiredness) of the speakers, information regarding mood of the speakers, information regarding emotions of the speakers, information regarding a measure of stress of the speakers, information regarding a measure of anxiety of the speakers, among other examples.

For example, the third machine learning model 122 may be trained to analyze the image data to identify information regarding speakers. For instance, the third machine learning model 122 may be trained to analyze pixels of the image data to identify the information regarding speakers. In some examples, different pixels may identify the tones of the speakers, the dialects of the speakers, the measure of fatigue (or tiredness) of the speakers, the mood of the speakers, the emotions of the speakers, the measure of stress of the speakers, and/or the measure of anxiety of the speakers.

Unlike the second machine learning model 118, the third machine learning model 122 may be trained to identify the tones of the speakers, the dialects of the speakers, the measure of fatigue (or tiredness) of the speakers, the mood of the speakers, and/or the emotions of the speakers over an entirety of the historical calls. The third machine learning model 122 may be trained in a manner similar to the manner described above in connection with the second machine learning model 118.

Figure 1E:
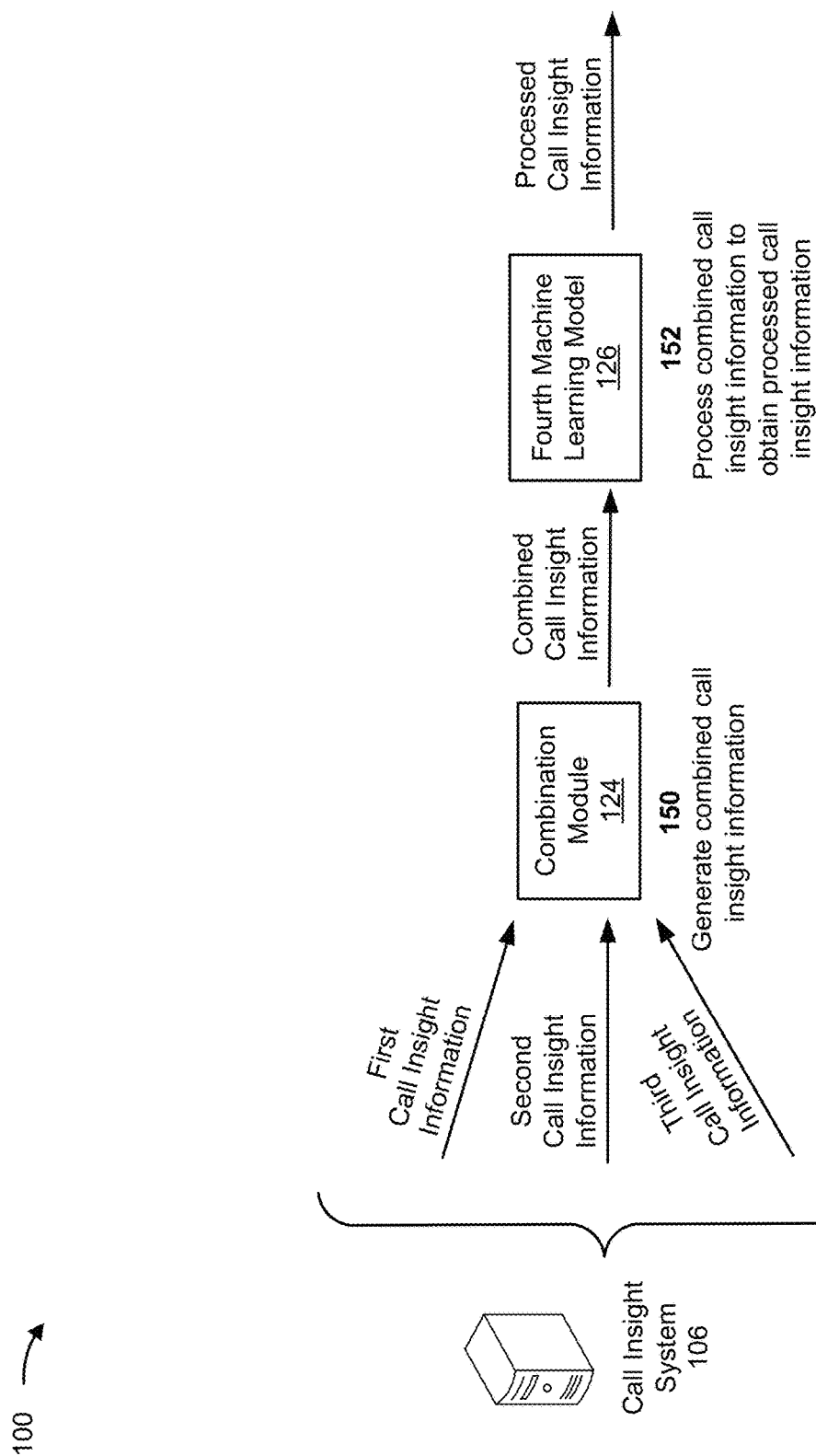

As shown in FIG. 1E, and by reference number 150, the call insight system 106 may generate combined call insight information. For example, the call insight system 106 may generate the combined call insight information using the combination module 124. In some examples, the call insight system 106 (e.g., using the combination module 124) may combine the first call insight information, the second call insight information, and the third call insight information to generate the combined call insight information. By combining the first call insight information, the second call insight information, and the third call insight information, the call insight system 106 may augment information output individually by the machine learning models discussed above. In some implementations, the first call insight information, the second call insight information, and the third call insight information may be in the form of vectors. Accordingly, the combined call insight information may be a combination of the vectors.

As shown in FIG. 1E, and by reference number 152, the call insight system 106 may process the combined call insight information to obtain processed call insight information. For example, the call insight system 106 may process the combined call insight information, using the fourth machine learning model 126, to obtain the processed call insight information. The fourth machine learning model 126 may be trained using historical transcription data and historical time series data in a manner similar to the manner described above.

The fourth machine learning model 126 may be trained to predict one or more call insights regarding the call based on the combined call insight information. For instance, the fourth machine learning model 126 may be trained to predict the context associated with the call (e.g., billing, service upgrade, among other examples), the sentiment of the customer service agent and/or of the customer during the call (e.g., satisfied or not satisfied), the intent associated with the call (e.g., resolve a discrepancy regarding a bill, to adjust service subscription), the resolution associated with the call (e.g., whether an issue was resolved during the call), the tones of the customer service agent and/or the customer during the call, the accents of the customer service agent and/or the customer, the dialects of the customer service agent and/or the customer, the measure of fatigue (or tiredness) of the customer service agent and/or the customer, the overall mood of the customer service agent and/or the customer during the call, the overall emotions of the customer service agent and/or the customer during the call, the measure of stress of the customer service agent and/or the customer, the measure of anxiety of the customer service agent and/or the customer, a measure of enthusiasm of the customer service agent and/or the customer during the call, a measure of sarcasm of the customer service agent and/or the customer during the call, among other examples.

The fourth machine learning model 126 may be trained to identify a period of overlapping speech (between the customer service agent and the customer) during the call and predict a meaning of the period of overlapping speech. For example, the fourth machine learning model 126 may identify the period of overlapping speech based on the first call insight information and the second call insight information. The fourth machine learning model 126 may predict that the period of overlapping speech indicates that the customer service agent and the customer are having a disagreement. In this regard, the fourth machine learning model 126 may analyze a portion of the transcription data preceding the period of overlapping speech to identify a subject of the disagreement.

Additionally, or alternatively, the fourth machine learning model 126 may be trained to identify a period of silence during the call (e.g., based on the time series data) and predict a meaning of the period of silence. For example, the fourth machine learning model 126 may predict that the period of silence indicates that the customer service agent and the customer are not communicating because the customer service agent is awaiting a response from the customer, or vice versa.

In some examples, the fourth machine learning model 126 may predict the one or more call insights by analyzing the transcription data in conjunction with the time series data. For example, with respect to the measure of sarcasm, the fourth machine learning model 126 may analyze text (from the transcription data) associated with a period of time of the call and analyze an amplitude and/or a frequency of the audio signal during the period of time to detect the measure of the sarcasm.

In some implementations, the call insight system 106 may provide, as an input to the fourth machine learning model 126, the combined call insight information. Additionally, the call insight system 106 may provide, as an input to the fourth machine learning model 126, information identifying one or more call insights that the fourth machine learning model 126 is to predict for the call. For example, the supervisor (of the customer service agent) may desire to identify the context associated with the call, the resolution associated with the call, and/or the mental state of the customer service agent (e.g., the measure of anxiety, the measure of stress, and the measure of fatigue). Accordingly, the call insight request may include information identifying the one or more call insights (e.g., information identifying the context, the resolution, and/or the mental state).

The fourth machine learning model 126 may filter the combined call insight information, based on the information identifying the one or more call insights, to obtain filtered call insight information. The filtered call insight information may include a portion of the combined call insight information that is associated with the one or more call insights. In some implementations, the fourth machine learning model 126 may include a neural network model and the combined call insight information may be filtered using a dense layer of the neural network model. The fourth machine learning model 126 may process the filtered call insight information and generate, as an output, processed call insight information that predicts the one or more call insights for the call.

Figure 1F:
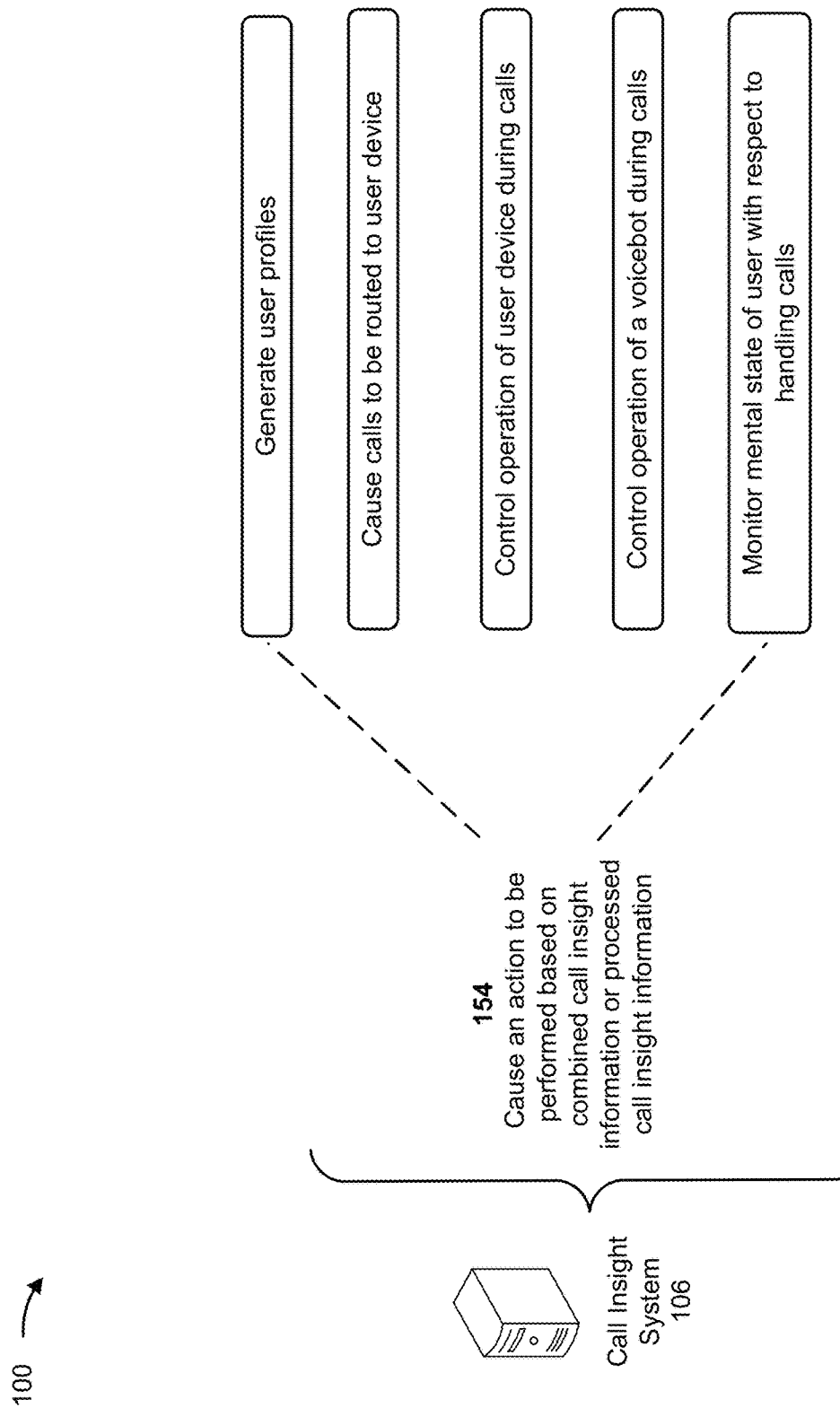

As shown in FIG. 1F, and by reference number 170, the call insight system 106 may cause an action to be performed based on the combined call insight information or the processed call insight information. In some implementations, the call insight system 106 may generate user profiles using the combined call insight information or the processed call insight information. For example, the call insight system 106 may generate a customer profile for the customer. The customer profile may be applicable to other customers that are part of a demographic of the customer. As example, the customer profile may include information identifying the context of the call, information identifying the measure of sarcasm of the customer during the call, information identifying the dialect and/or the accent of the customer, among other examples. The call insight system 106 may use the customer profile to route calls from the customer to an appropriate customer service agent.

In some implementations, the information identifying the context may be used to identify a typical context of calls received from the customer. Assume the context is billing, the information identifying the context may indicate that calls (from the customer) are typically related to billing issues. In this regard, subsequent calls from the customer may be routed to a user device of a customer service agent that has been trained to handle billing related calls.

Assume that the information identifying the measure of sarcasm indicates that the customer is typically sarcastic. The call insight system 106 may route calls, from the customer, to a customer service agent that has been trained to handle sarcastic customers. The information identifying the dialect and/or the accent of the customer may be used to route calls to a customer service agent that speaks the dialect and/or that has been trained to interact with customers with the accent In some implementations, the call insight system 106 may generate an agent profile for the customer service agent. The agent profile may include information identifying the context of the call, information identifying the resolution, information identifying the dialect and/or the accent of the customer, information identifying the measure of anxiety of the customer service agent, information identifying the measure of stress of the customer service agent, information identifying the measure of fatigue of the customer service agent, among other examples.

The call insight system 106 may use the agent profile to route calls from the customer to the customer service agent in a manner similar to the manner described above. In some implementations, the call insight system 106 may use the agent profile to determine whether calls are to be routed to the user device 104 of the customer service agent. For example, assume the measure of anxiety satisfies an anxiety threshold, the call insight system 106 may prevent calls from being routed to the user device 104 of the customer service agent, may transmit a signal to power down the user device 104 for a period of time or cause the user device 104 to be in a stand-by mode of operation for the period of time, may cause the calls to be routed to a user device of another customer service agent, among other examples of preventing the customer service agent from receiving calls. In some implementations, the period of time may be based on the measure of anxiety. For example, the period of time may increase as the measure of anxiety increases. The call insight system 106 may perform similar actions with respect to the measure of stress and/or the measure of fatigue.

In some implementations, the call insight system 106 may cause calls to be routed to the user device 104 of the customer service agent and/or to a user device of another customer service agent using the combined call insight information or the processed call insight information. The call insight system 106 may cause the calls to be routed in a manner similar to the manner described above. For example, the call insight system 106 may cause a call to be routed to the user device 104 of the customer service agent, out of a plurality of user devices that can handle the call, based on the agent profile (e.g., based on a portion of the combined call insight or the processed call insight information).

In some implementations, the call insight system 106 may control the operation of the user device of the customer service agent during calls. For example, the call insight system 106 may control the operation of the user device based on the customer profile. For instance, the call insight system 106 may monitor a behavior of the customer based on the processed call insight information and control the operation of the user device based on the customer profile to address the behavior of the customer.

For instance, assume that during a call, the call insight system 106 determines that a tone of a customer becomes aggressive, based on the processed call insight information. Further assume that the customer profile includes information that may be used to pacify the customer. The call insight system 106 may identify the information and cause the user device 104 of the customer service agent to provide the information to the customer. The customer service agent may use the information to pacify the customer.

The call insight system 106 may perform similar actions when the call insight system 106 determines that the customer is becoming anxious and/or stressed. Additionally, or alternatively, with respect to controlling the operation of the user device, the call insight system 106 may prevent calls from being routed to the customer service agent, in a manner similar to the manner described above with respect to the measure of fatigue, the measure of anxiety, and/or the measure of stress of the customer service agent.

In some implementations, the call insight system 106 may control an operation of a voicebot during calls. For example, the call insight system 106 may use the customer profile to train the voicebot to handle calls from the customer. In this regard, the call insight system 106 may cause a call to be routed to the voicebot and may cause the operation of the voicebot to be controlled during the call, based on the customer profile. In some implementations, the call insight system 106 may monitor a behavior of the customer and provide, to the voicebot, information to address the behavior of the customer in a manner similar to the manner described above.

In some implementations, the call insight system 106 may monitor a mental state of user with respect to handling calls. For example, monitor the measure of anxiety, the measure of stress, and/or the measure of fatigue of the customer service agent based on the processed call insight information. For example, the call insight system 106 may analyze the processed call insight information to determine whether the measure of anxiety is approaching the anxiety threshold, whether the measure of stress is approaching a stress threshold, and/or whether the measure of fatigue is approaching a fatigue threshold. In some examples, when the measure of anxiety satisfies the anxiety threshold, when the measure of stress satisfies the stress threshold, and/or when the measure of fatigue satisfies the fatigue threshold, the call insight system 106 may prevent calls from being routed to the user device 104 of the customer service agent in a manner similar to the manner described above.

In some implementations, the call insight system 106 may use the processed call insight information to determine a measure of satisfaction of the customer and/or a measure of satisfaction of other customers with respect to interactions with the customer service agent and/or other customer service agents of the call center. For example, the call insight system 106 may use the processed call insight information to identify the intent of the call, the resolution of the call, the sentiment of the customer during the call, among other examples. The call insight system 106 may determine the measure of satisfaction of the customer based on the intent of the call, the resolution of the call, the sentiment of the customer during the call, among other examples. The call insight system 106 may use the measure of satisfaction to determine a measure of quality of the call center.

In some implementations, the call insight system 106 may analyze the audio data of the call, the time series data of the audio signal of the call, and/or the image data of the waveform and/or the spectrogram of the audio signal of the call in order to generate the combined call insight information. For example, the call insight system 106 may generate call insight information without using the dense layer of the neural network model (discussed above). As explained above, the time series data may include data identifying different frequencies of the audio signal over a period of time and/or different amplitudes of the audio signal over the period of time. The call insight system 106 may analyze the transcription data to generate the first call insight information, analyze the time series data to generate the second call insight information, and/or analyze the image data to generate the third call insight information. The call insight system 106 may combine the first call insight information, the second call insight information, and/or the third call insight information to generate the combined call insight information, without using the dense layer of the neural network model. The call insight system 106 may perform one or more of the actions described above, using the combined call insight information (e.g., instead of using the filtered call insight information). For example, assume that the combined call insight information identifies a measure of sarcasm of a customer and indicates that the customer is typically sarcastic. The call insight system 106 may route calls, from the customer, to a customer service agent that has been trained to handle sarcastic customers.

As explained herein, the call insight system 106 may enable appropriate calls to be routed to the customer service agent. By enabling the appropriate calls to be routed to the customer service agent, the call insight system may preserve computing resources, networking resources, and other resources that would have otherwise been used to re-route calls to another customer service agent.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
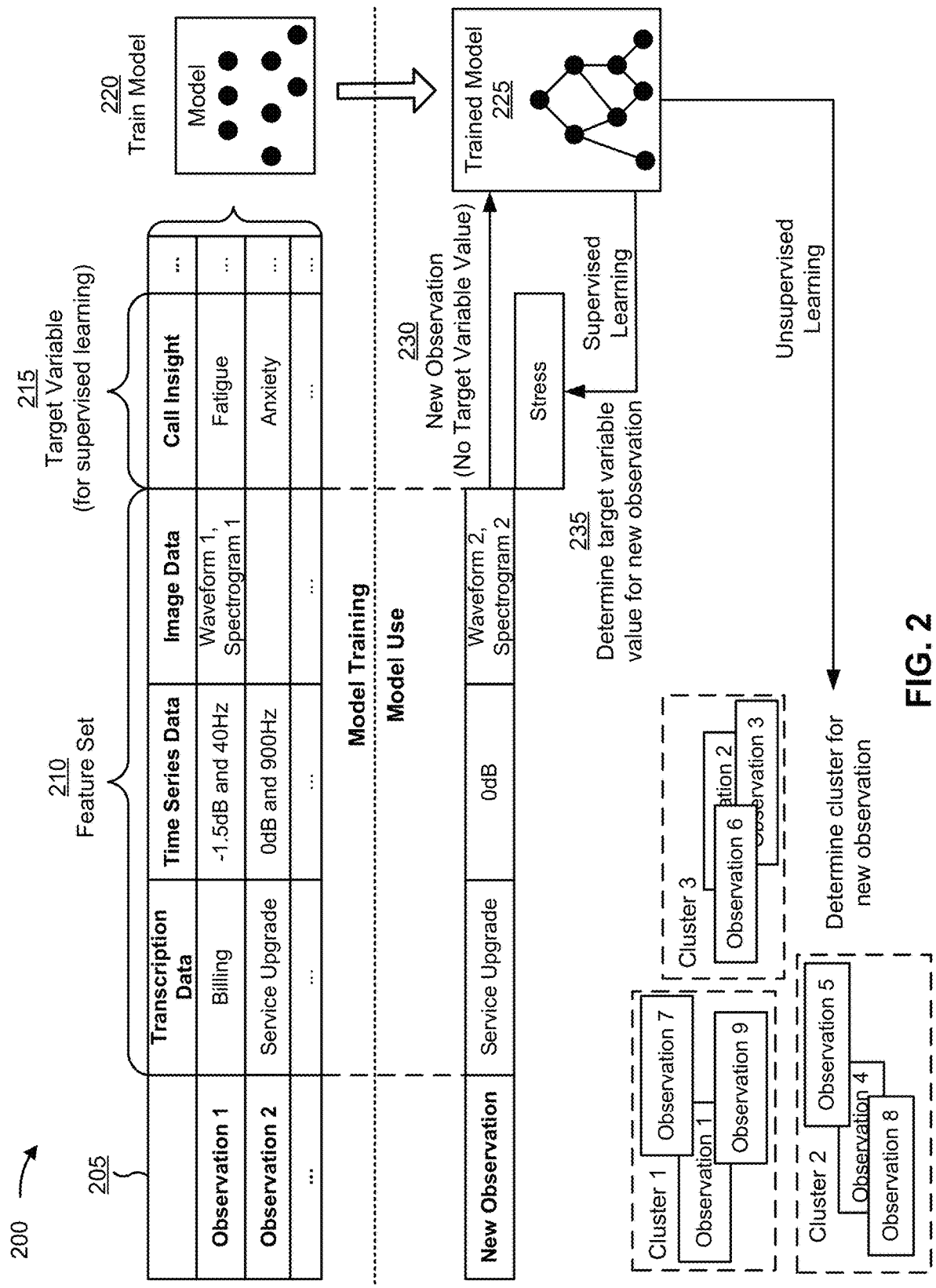
FIG. 2 is a diagram illustrating an example of training and using a machine learning model in connection with handling calls based on call insight information.

FIG. 2 is a diagram illustrating an example 200 of training and using a machine learning model in connection with handling calls based on call insight information. The machine learning model training and usage described herein may be performed using a machine learning system. The machine learning system may include or may be included in a computing device, a server, a cloud computing environment, or the like, such as the call insight system 106.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the call insight system 106, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the call insight system 106. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of transcription data, a second feature of time series data, a third feature of image data, and so on. As shown, for a first observation, the first feature may have a value of Billing, the second feature may have a value of −1.5 dB and 40 Hz, the third feature may have a value of waveform 1, spectrogram 1, and so on. These features and feature values are provided as examples and may differ in other examples. For example, the feature set may include one or more of the following features: first call insight information (based on transcription data), second call insight information (based on time series data), and/or third call insight information (based on image data).

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is call insight, which has a value of fatigue for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of Service upgrade, a second feature of 0 dB, a third feature of waveform 2, spectrogram 2, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of stress for the target variable of call insight for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, disable user device of customer service agent. The first automated action may include, for example, disabling the user device.

As another example, if the machine learning system were to predict a value of fatigue for the target variable of call insight, then the machine learning system may provide a second (e.g., different) recommendation (e.g., route next two calls to another customer service agent) and/or may perform or cause performance of a second (e.g., different) automated action (e.g., routing the next two calls to another customer service agent).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to routing calls to a customer service agent. The machine learning system enables recognition and/or identification of tens, hundreds, thousands, or millions of features and/or feature values for tens, hundreds, thousands, or millions of observations, thereby increasing accuracy and consistency and reducing delay associated with routing calls to a customer service agent relative to requiring computing resources to be allocated for tens, hundreds, or thousands of operators to manually routing calls to a customer service agent using the features or feature values.

As indicated above, FIG. 2 is provided as an example. Other examples may differ from what is described in connection with FIG. 2.

Figure 3:
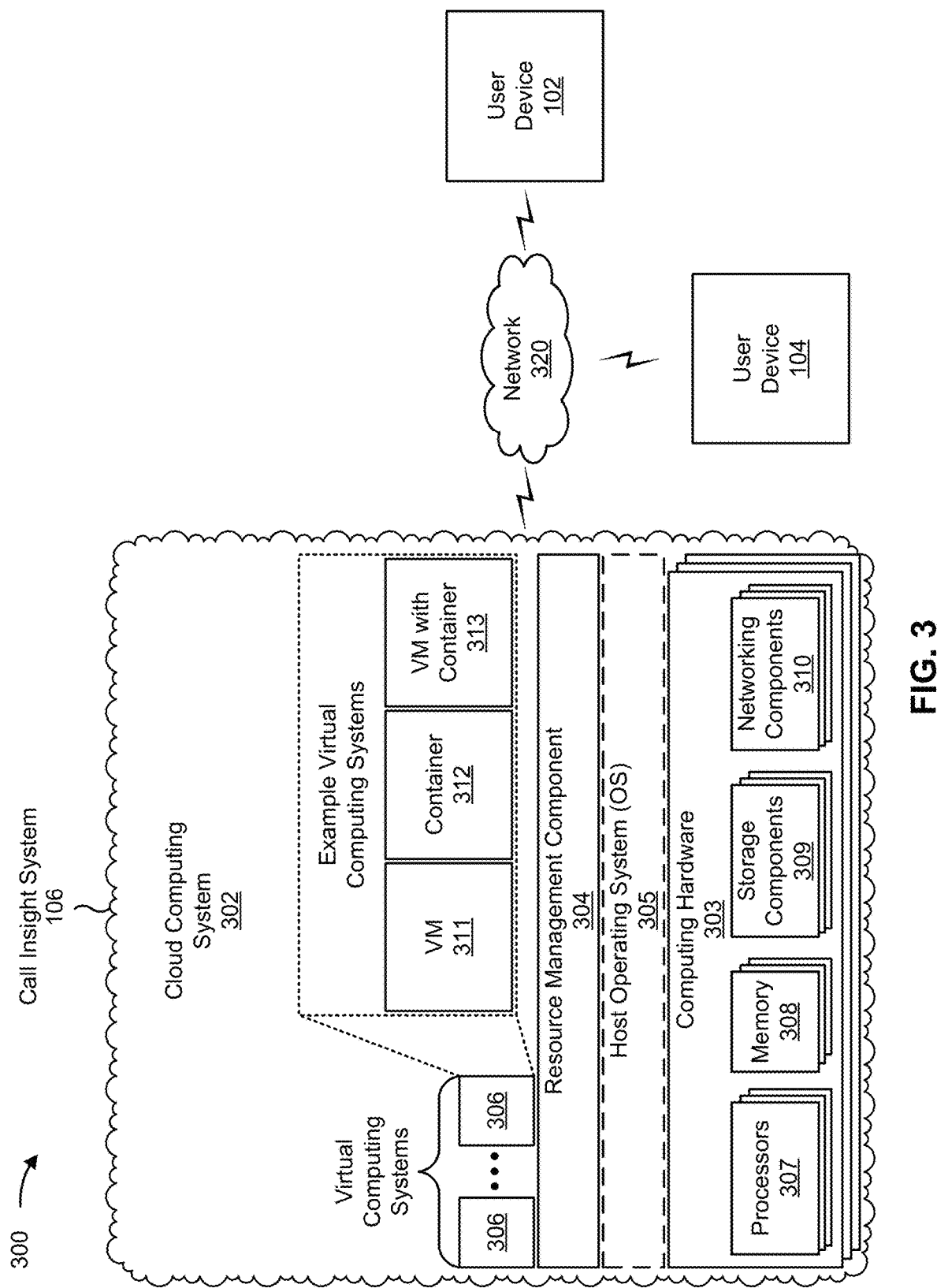
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a call insight system 106, which may include one or more elements of and/or may execute within a cloud computing system 302. The cloud computing system 302 may include one or more elements 303-313, as described in more detail below. As further shown in FIG. 3, environment 300 may include a network 320, a user device 102, call insight system 106, and/or a user device 104. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the call insight system 106 may include one or more elements 303-313 of the cloud computing system 302, may execute within the cloud computing system 302, and/or may be hosted within the cloud computing system 302, in some implementations, the call insight system 106 may not be cloud-based (e.g., may be implemented outside of a cloud computing system) or may be partially cloud-based. For example, the call insight system 106 may include one or more devices that are not part of the cloud computing system 302, such as device 400 of FIG. 4, which may include a standalone server or another type of computing device. The call insight system 106 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The user device 102 may include includes one or more devices capable of receiving, generating, storing, processing, and/or providing information, as described elsewhere herein. The user device 102 may include a communication device. For example, user device 102 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The user device 104 may include includes one or more devices capable of receiving, generating, storing, processing, and/or providing information, as described elsewhere herein. The user device 104 may include a communication device. For example, user device 104 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
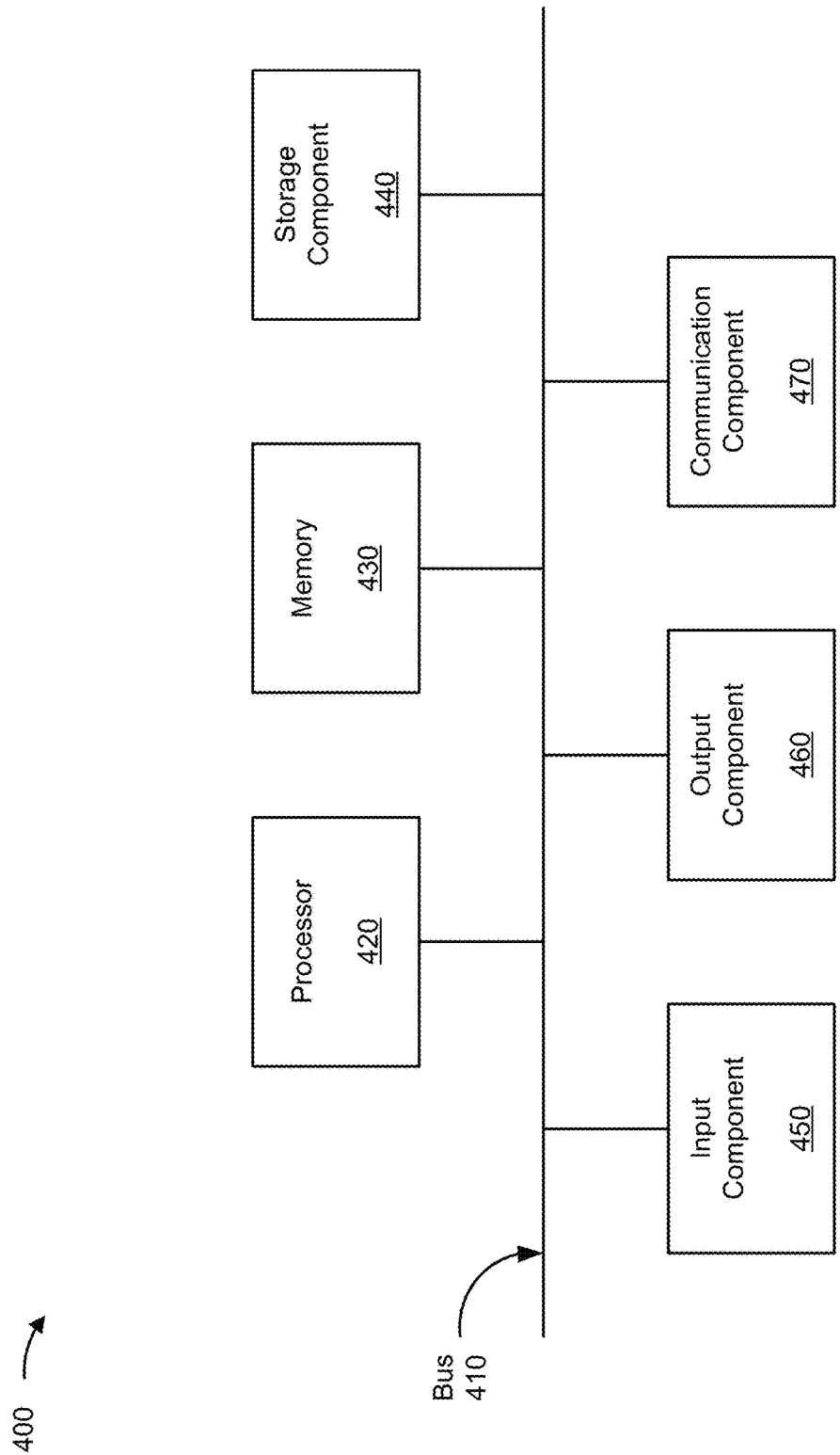
FIG. 4 is a diagram of example components of one or more devices of FIG. 3.

FIG. 4 is a diagram of example components of one or more devices of FIG. 3. The one or more devices correspond to a device 400, which may correspond to the call insight system 106, the user device 102, and/or the user device 104. In some implementations, the call insight system 106, the user device 102, and/or the user device 104 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
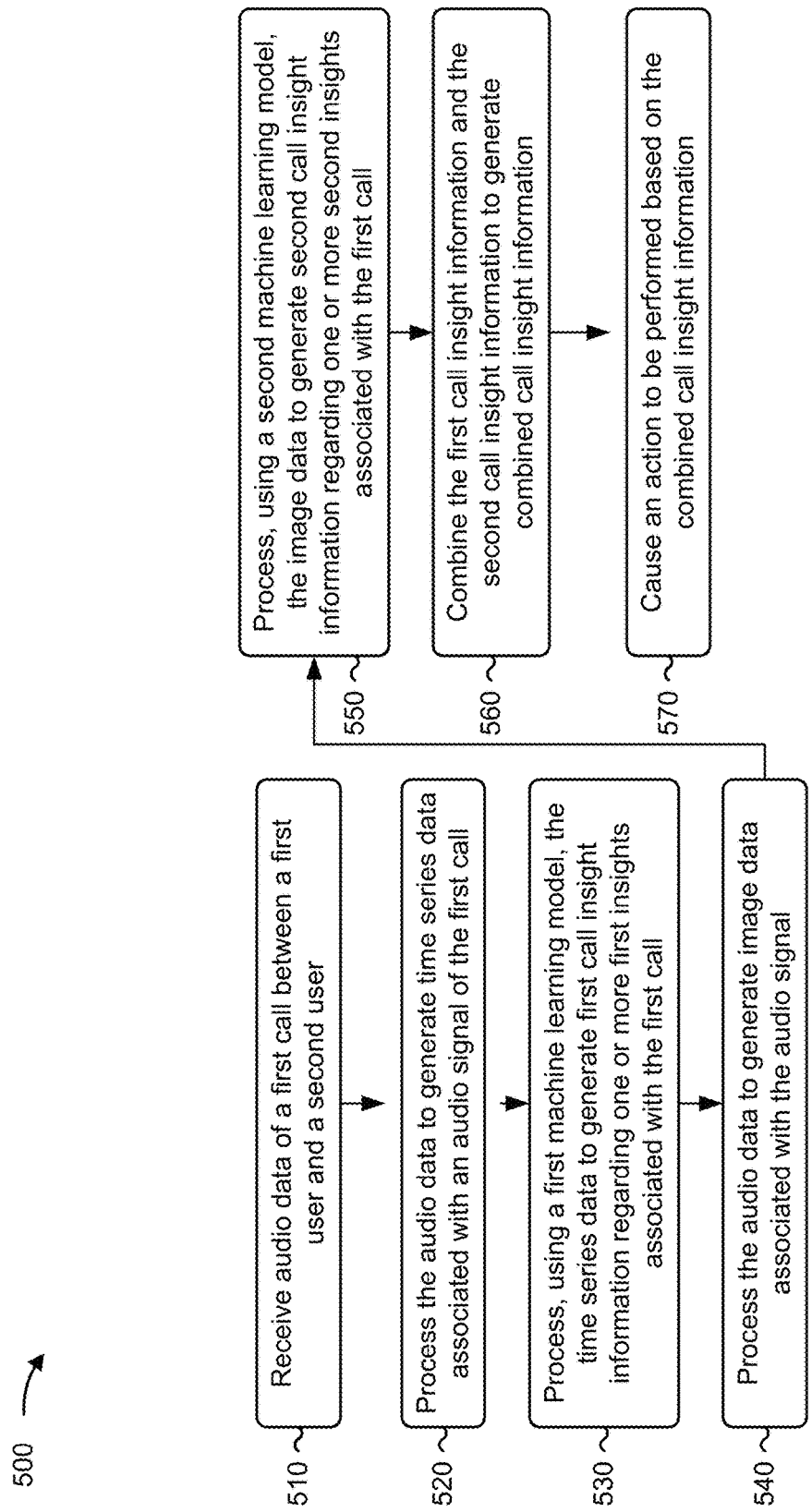
FIG. 5 is a flowchart of an example process associated with handling calls based on call insight information.

FIG. 5 is a flowchart of an example process 500 associated with handling calls based on call insight information. In some implementations, one or more process blocks of FIG. 5 may be performed by a call insight system (e.g., call insight system 106). In some implementations, one or more process blocks of FIG. 5 may be performed by another device or a group of devices separate from or including the device, such as a call insight system (e.g., call insight system 106), a user device (e.g., user device 102), and/or another user device (e.g., user device 104). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving audio data of a first call between a first user and a second user (block 510). For example, the device may receive audio data of a first call between a first user and a second user, as described above.

As further shown in FIG. 5, process 500 may include processing the audio data to generate time series data associated with an audio signal of the first call (block 520). For example, the device may process the audio data to generate time series data associated with an audio signal of the first call, as described above.

Process 500 may include performing a data augmentation operation on the time series data to obtain augmented time series data. Performing the data augmentation operation may include adding white noise to the time series data, performing an audio shifting operation on the time series data, performing a pitch adjustment operation on the time series data, or performing a speed adjustment operation on the time series data. Processing the time series data to generate the first call insight information may include processing the augmented time series data to generate the first call insight information.

As further shown in FIG. 5, process 500 may include processing, using a first machine learning model, the time series data to generate first call insight information regarding one or more first insights associated with the first call (block 530). For example, the device may process, using a first machine learning model, the time series data to generate first call insight information regarding one or more first insights associated with the first call, as described above.

As further shown in FIG. 5, process 500 may include processing the audio data to generate image data associated with the audio signal (block 540). For example, the device may process the audio data to generate image data associated with the audio signal, as described above.

As further shown in FIG. 5, process 500 may include processing, using a second machine learning model, the image data to generate second call insight information regarding one or more second insights associated with the first call (block 550). For example, the device may process, using a second machine learning model, the image data to generate second call insight information regarding one or more second insights associated with the first call, as described above.

In some implementations, the image data identifies at least one of an image of the waveform or an image of the spectrogram. Process 500 may include adjusting a resolution of the at least one the image of waveform or the image of the spectrogram to obtain adjusted image data. Processing the image data may include processing the adjusted image data to generate the second call insight information.

As further shown in FIG. 5, process 500 may include combining the first call insight information and the second call insight information to generate combined call insight information (block 560). For example, the device may combine the first call insight information and the second call insight information to generate combined call insight information, as described above.

As further shown in FIG. 5, process 500 may include causing an action to be performed based on the combined call insight information (block 570). For example, the device may cause an action to be performed based on the combined call insight information, wherein the action is associated with a second call, as described above. In some implementations, the action is associated with a second call.

In some implementations, causing the action to be performed includes causing the second call to be routed to a voicebot, and controlling an operation of the voicebot during the second call based on a portion of the combined call insight information.

In some implementations, causing the action to be performed includes causing the second call to be routed to a user device, out of a plurality of user devices that can handle the second call, based on a portion of the combined call insight.

In some implementations, the second call is routed to a user device, and wherein causing the action to be performed includes controlling an operation of the user device during the second call.

In some implementations, process 500 includes processing the combined call insight information, using a dense layer of a neural network, to obtain processed call insight information, and wherein causing the action to be performed comprises causing the action to be performed based on the processed call insight information.

In some implementations, causing the action to be performed includes monitoring a mental state, of the first user, with respect to handling calls based on a portion of the combined call insight information, wherein the mental state includes at least one of a measure of stress, a measure of anxiety, or a measure of fatigue, and preventing the second call from being routed to a user device of the first user based on the mental state of the first user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a device, audio data of a first call between a first user and a second user;
      generating, by the device, based on the audio data, time series data associated with an audio signal of the first call;
   processing, by the device and using a first machine learning model, the time series data to generate first call insight information regarding one or more first insights associated with the first call;
   processing, by the device, the audio data to generate image data associated with the audio signal;
   processing, by the device and using a second machine learning model, the image data to generate second call insight information regarding one or more second insights associated with the first call;
   combining, by the device, the first call insight information and the second call insight information to generate combined call insight information; and
   causing, by the device, an action to be performed based on the combined call insight information,
      wherein the action is associated with a second call.

2. The method of claim 1, wherein causing the action to be performed includes:
   causing the second call to be routed to a voicebot; and
   controlling an operation of the voicebot during the second call based on a portion of the combined call insight information.

3. The method of claim 1, wherein causing the action to be performed includes:
   causing the second call to be routed to a user device, out of a plurality of user devices that can handle the second call, based on a portion of the combined call insight.

4. The method of claim 1, wherein the second call is routed to a user device; and
   wherein causing the action to be performed includes:
      controlling an operation of the user device during the second call.

5. The method of claim 1, further comprising:
   processing the combined call insight information, using a dense layer of a neural network, to obtain processed call insight information; and
   wherein causing the action to be performed comprises:
      causing the action to be performed based on the processed call insight information.

6. The method of claim 1, wherein causing the action to be performed includes:
   monitoring a mental state, of the first user, with respect to handling calls based on a portion of the combined call insight information,
      wherein the mental state includes at least one of a measure of stress, a measure of anxiety, or a measure of fatigue; and
   preventing the second call from being routed to a user device of the first user based on the mental state of the first user.

7. The method of claim 1, further comprising:
   transcribing the first call, based on the audio data, to generate transcription data;
   processing, using a third machine learning model, the transcription data to generate third call insight information regarding one or more third insights associated with the first call; and
      wherein combining the first call insight information and the second call insight information to generate the combined call insight information includes:
         combining the first call insight information, the second call insight information, and the third call insight information to generate the combined call insight information.

8. A device, comprising:
   one or more processors configured to:
      generate, based on audio data of a first call between a first user and a second user, time series data associated with an audio signal of the first call;
      process, using a first machine learning model, the time series data to generate first call insight information regarding one or more first insights associated with the first call;
      process the audio data to generate image data associated with the audio signal,
         wherein the image data identifies at least one of a waveform of the audio signal or a spectrogram of the audio signal;
      process, using a second machine learning model, the image data to generate second call insight information regarding one or more second insights associated with the first call; and
      cause an action to be performed based on the first call insight information and the second call insight information,
         wherein the action is performed during the first call or during a second call subsequent to the first call.

9. The device of claim 8, wherein the one or more processors are further configured to:
   perform a data augmentation operation on the time series data to obtain augmented time series data;
   wherein the one or more processors, to perform the data augmentation operation, are configured to at least one of:
      add white noise to the time series data,
      perform an audio shifting operation on the time series data,
      perform a pitch adjustment operation on the time series data, or
      perform a speed adjustment operation on the time series data; and
   wherein, to process the time series data to generate the first call insight information, the one or more processors are further configured to:
      process the augmented time series data to generate the first call insight information.

10. The device of claim 8, wherein the image data identifies at least one of an image of the waveform or an image of the spectrogram; and
   wherein the one or more processors are further configured to:
      adjust a resolution of the at least one of the image of waveform or the image of the spectrogram to obtain adjusted image data; and wherein, to process the image data, the one or more processors are further configured to:
process the adjusted image data to generate the second call insight information.

11. The device of claim 8, wherein the one or more processors are further configured to:
transcribe the first call, based on the audio data, to generate transcription data;
process, using a third machine learning model, the transcription data to generate third call insight information regarding one or more third insights associated with the first call; and
wherein, to cause the action, the one or more processors are configured to:
cause the action to be performed based on the first call insight information, the second call insight information, and the third call insight information.

12. The device of claim 11, wherein the one or more processors are further configured to:
combine the first call insight information, the second call insight information, and the third call insight information to generate combined call insight information; and
wherein, to cause the action, the one or more processors are configured to:
cause the action to be performed based on the combined call insight information.

13. The device of claim 12, wherein the combined call insight information includes at least one of:
information regarding a context associated with the first call,
information regarding a sentiment of the first user or a sentiment of the second user during the first call,
information regarding an intent associated with the first call,
information regarding a resolution associated with the first call,
information regarding a measure of sarcasm of the first user or a measure of sarcasm of the second user during the first call,
information regarding a tone of the first user or a tone of the second user during the first call,
information regarding a speed of speech of the first user or a speed of speech of the second user during the first call,
information regarding a dialect of the first user or a dialect of the second user, or
information regarding a measure of fatigue of the first user or a measure of fatigue of the second user during the first call.

14. The device of claim 8, wherein, to cause the action, the one or more processors are configured to:
generate a profile associated with the second user, based on the first call insight information and the second call insight information;
identify information to be provided to the second user based on the profile; and
cause the information to be provided to the second user during the second call.

15. A non-transitory computer-readable medium storing a set of instructions, the set of instructions comprising:
one or more instructions that, when executed by one or more processors of a device, cause the device to:
obtain transcription data generated based on transcribing a first call between a first user and a second user;
process, using a first machine learning model, the transcription data to generate first call insight information regarding one or more first insights associated with the first call;
obtain time series data associated with an audio signal during the first call;
process, using a second machine learning model, the time series data to generate second call insight information regarding one or more second insights associated with the first call;
obtain image data associated with the first call,
wherein the image data identifies at least one a waveform associated with the audio signal or a spectrogram associated with the audio signal;
process, using a third machine learning model, the image data to obtain third call insight information regarding one or more third insights associated with the first call;
combine the first call insight information, the second call insight information, and the third call insight information to generate combined call insight information; and
at least one of:
cause a voicebot to be trained, based on a first portion of the combined call insight information;
cause a second call to be routed to a user device of the first user, based on a second portion of the combined call insight information; or
control an operation of the user device during the first call or the second call, based on a third portion of the combined call insight information.

16. The non-transitory computer-readable medium of claim 15, wherein one or more of the first machine learning model, the second machine learning model, and the third machine learning model include neural network models.

17. The non-transitory computer-readable medium of claim 15, wherein the one or more instructions further cause the device to:
generate a profile associated with the first user, based on the combined call insight information;
wherein the one or more instructions, to cause the second call to be routed to the user device of the first user, further cause the device to:
identify information regarding the second call; and
cause the second call to be routed to the user device of the first user based on the information regarding the second call and the profile.

18. The non-transitory computer-readable medium of claim 15, wherein the combined call insight information includes one or more of:
information regarding a measure of anxiety of the first user or a measure of anxiety of the second user,
information regarding a measure of stress of the first user or a measure of stress of the second user,
information regarding a context associated with the first call,
information regarding a sentiment of the first user or a sentiment of the second user during the first call,
information regarding an intent associated with the first call,
information regarding a resolution associated with the first call,
information regarding a measure of sarcasm of the first user or a measure of sarcasm of the second user,
information regarding a tone of the first user or a tone of the second user during the first call, information regarding a speed of speech of the first user or a speed of speech of the second user, information regarding a dialect of the first user or a dialect of the second user, or information regarding a measure of fatigue of the first user or a measure of fatigue of the second user.

19. The non-transitory computer-readable medium of claim 15, wherein the one or more instructions further cause the device to:

cause a third call to be routed to the voicebot after causing the voicebot to be trained; and control an operation of the voicebot during the third call.

20. The non-transitory computer-readable medium of claim 15, wherein the one or more second insights are associated with discrete portions of the first call, and wherein the one or more third insights are associated with an entirety of the first call.

\* \* \* \* \*